United States Patent [19]

Longacre, Jr. et al.

[11] Patent Number: 4,587,559

[45] Date of Patent: May 6, 1986

[54] REFRESHING OF DYNAMIC MEMORY

[75] Inventors: Andrew Longacre, Jr., Skaneateles; Joseph J. Sarofeen, Auburn, both of N.Y.

[73] Assignee: Welch Allyn, Inc., Skaneateles Falls, N.Y.

[21] Appl. No.: 474,330

[22] Filed: Mar. 11, 1983

[51] Int. Cl.⁴ .......... H04N 5/14

[52] U.S. Cl. .......... 358/160; 358/22; 340/750; 365/222

[58] Field of Search .......... 358/160, 21 R, 22; 340/750; 365/222, 230

[56] References Cited

U.S. PATENT DOCUMENTS 4,482,979 11/1984 May .......... 340/750

*Primary Examiner*—Tommy P. Chin
*Assistant Examiner*—Michael D. Parker
*Attorney, Agent, or Firm*—Bruns and Wall

[57] ABSTRACT

A refreshable dynamic memory is used to drive a video display wherein each row of stored memory is accessed to provide one line of video. The memory row address counter is incremented a number of times during the horizontal retrace period to sequentially refresh a given number of memory rows before another row is displayed. The cycle is repeated until an entire field is displayed. A sufficient number of rows are refreshed during each line whereby the rows are refreshed continually within the storage time of the memory cells.

5 Claims, 4 Drawing Figures

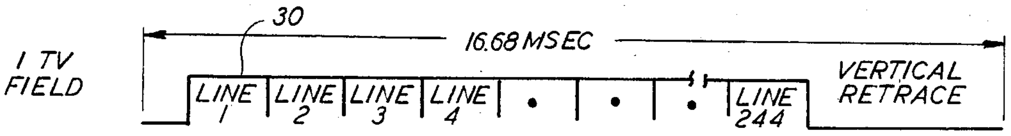
FIG. 2
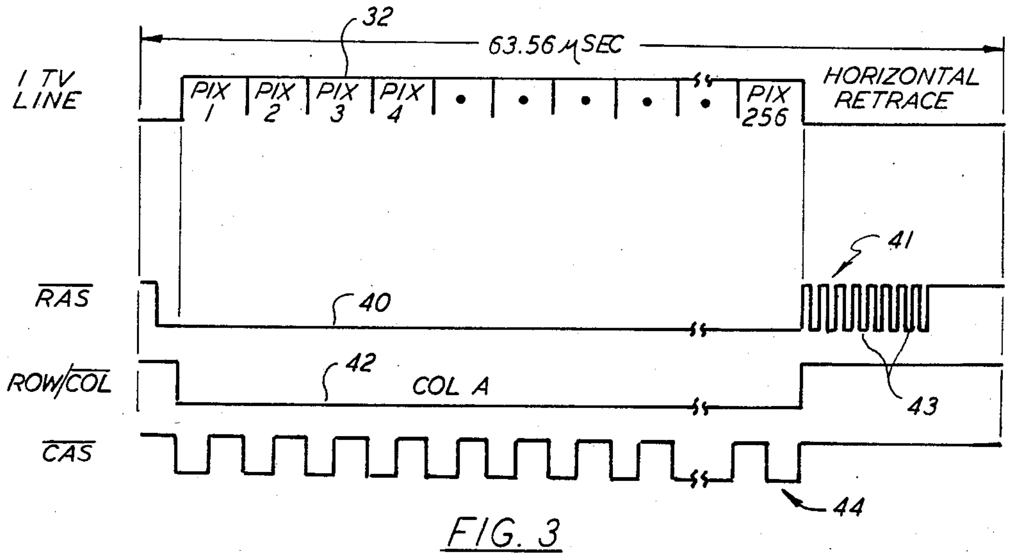
FIG. 3
| ROW ADDRS | CYCLE | | | | | | | | | |
|---|---|---|---|---|---|---|---|---|---|---|
| | 1 | 2 | 3 | 4 | 5 | 6 | 7 | 8 | 9 | 1 |
| 0 | D | R | R | R | R | R | R | R | R | D |
| 1 | R | R | D | R | R | R | R | R | R | R |
| 2 | R | R | R | R | D | R | R | R | R | R |
| 3 | R | R | R | R | R | R | D | R | R | R |
| 4 | R | R | R | R | R | R | R | R | D | R |
| 5 | R | D | R | R | R | R | R | R | R | R |
| 6 | R | R | R | D | R | R | R | R | R | R |
| 7 | R | R | R | R | R | D | R | R | R | R |
| 8 | R | R | R | R | R | R | R | D | R | R |
| 9 | D | R | R | R | R | R | R | R | R | D |
| 10 | R | R | D | R | R | R | R | R | R | R |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| 252 | D | R | R | R | R | R | R | R | R | D |
| 253 | R | R | D | R | R | R | R | R | R | R |
| 254 | R | R | R | R | D | R | R | R | R | R |
| 255 | R | R | R | R | R | R | D | R | R | R |
FIG. 4

REFRESHING OF DYNAMIC MEMORY

BACKGROUND OF THE INVENTION

This invention relates generally to video systems and, in particular, to a technique for refreshing a dynamic memory that is used to drive a video display.

Typically, video image information is stored in the system in the form of digitized data that can be read out of the memory in a row by row mode to drive the video display in a line by line sequence. If static memories are used to drive the video display, they are capable of holding the data for the entire time period required to scan a full field. A typical dynamic memory, on the other hand, generally has to be refreshed about nine times during a conventional video field. Static memories, however, are relatively costly and space consuming. A dynamic memory, on the other hand, represents a cost attractive means for storing image data, requires less power to operate and is suitable for higher density construction, that is, more cells per unit area when compared to a static memory of the same capacity.

Many U.S. patents describe various schemes for refreshing dynamic memories. These patents that are known to applicants are:

| | | |
|---|---|---|
| 3,684,897 | 4,040,122 | 4,232,376 |
| 3,691,536 | 4,079,462 | 4,293,931 |
| 3,737,879 | 4,203,159 | 4,293,932 |
| 3,729,722 | 4,207,618 | 4,296,480 |
| 3,790,961 | 4,249,247 | 4,328,566 |

None of these patents, however, describes a refreshing system that is especially adapted to the scanning rate of a standard video display wherein each field is scanned in slightly over sixteen milliseconds. It should be further noted that most of these prior art refreshing devices require a separate refresh address counter to carry out the refreshing function and another level of multiplexing, which increases the cost of the equipment and the size and complexity of the system.

SUMMARY OF THE INVENTION

It is therefore an object of the present invention to improve dynamic memory systems and, in particular, dynamic memories used to drive a video display.

A further object of the present invention is to refresh a dynamic memory that is used to store digitized image data that is read out of the memory at standard video field rates to drive a video display.

A still further object of the present invention is to reduce the amount of hardware that is required to refresh a dynamic memory used to drive a video display.

Another object of the present invention is to reduce the cost of circuits required to refresh a dynamic memory used to drive a video display.

Yet another object of the present invention is to refresh a dynamic memory used to drive a video display several times during each video field by refreshing during the horizontal retrace.

These and other objects of the present invention are attained by a technique for refreshing a dynamic memory that is used to drive a video display wherein image data is scanned in a line by line sequence and a horizontal retrace interval is provided between lines. A row address counter addresses the memory to latch the first display row in the memory. A column address counter then addresses the memory whereupon the cells in the latched row are read out at video speed to display a line of image data. During the retrace interval, the row address counter increments the memory a plurality of times to refresh the data in a predetermined number of rows. The above sequence is then repeated a number of times needed to display a full field of data. The number of refreshing cycles initiated between each displayed row is a function of the time that each memory cell can hold the image data before it must be refreshed. In a typical application wherein the memory is used to drive a standard television display, each row will be displayed once and refreshed nine times during a video field.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 2 graphically illustrates on a time line basis the contents of each video field;

FIG. 3 illustrates the timing sequence of the row address strobe pulse and the column address strobe pulse as they relate to one line of video display; and FIG. 4 is a table showing the function of each row of memory as it is cycled nine times during each video field.

DESCRIPTION OF THE INVENTION

Figure 1:
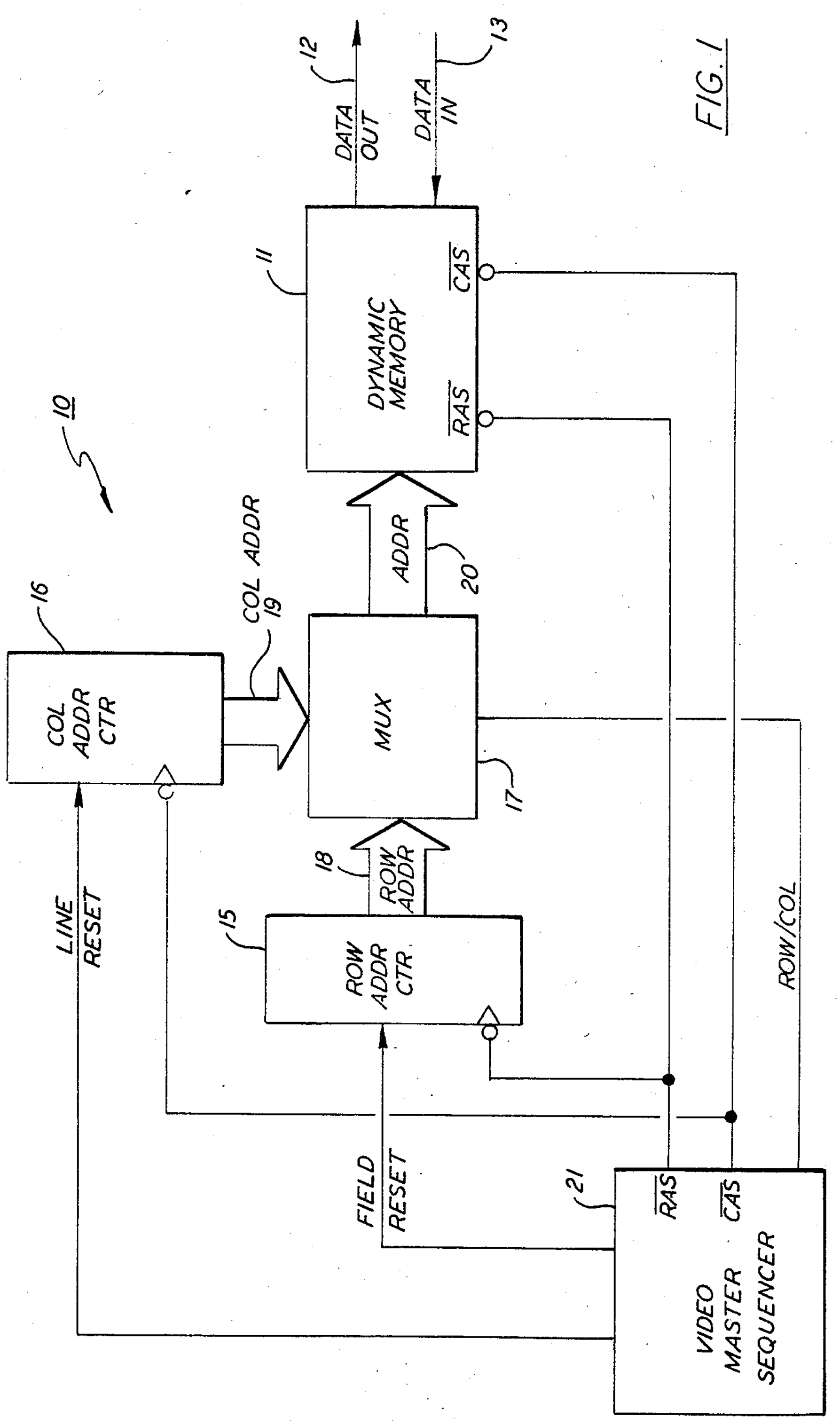
FIG. 1 is a block diagram illustrating a refreshing system for a dynamic memory that is used to drive a video display.

The present invention involves a technique for refreshing a dynamic memory that is employed to drive a standard video display. Although the video system is not shown, it should be understood that it includes a display screen and associated deflection circuits for scanning image data in a line by line sequence to provide a field of data. As is well known in the art, the memory which is a dynamic random access memory (RAM) is accessed in synchronization with the deflection of the display whereby each accessed row of data provides one line of display information. It should be further noted that the present system can be used in either a black and white video system or in a color video system without departing from the scope of the invention. In the color system, three separate memory drives are utilized to provide red, green and blue image data. However, the refreshing scheme used in each of the three memory drives are the same and, accordingly, only one of the refreshing systems will be described in greater detail below.

Referring initially to FIG. 1, there is illustrated a block diagram showing a refreshing system, generally referenced 10, embodying the teachings of the present invention. The system includes a dynamic random access memory (RAM) 11 that is adapted to store digitized image data and, upon being accessed, forwards this data to the display circuits of a video system for presentation upon a screen. Although the memory is shown schematically, it should be understood that it is not necessarily limited to a single chip. The memory, however, is arranged to store data in rows and columns that are accessed at video speed in synchronization with the video display so that the stored data is displayed in a line by line sequence with each row of memory providing a line of data. For purposes of this disclosure, it will be assumed that the memory cells are arranged in a 256 row by 256 column format and are thus capable of storing a full field of image data. As is typical in the art, the memory also contains a refresh capability whereby the data stored in an entire row is refreshed when the row is activated by a row address strobe pulse.

A data output line 12 carries accessed data from the memory to the video display. A data input line 13 is used to apply new data to the memory. The data is typically upgraded between frames as for example during the vertical retrace interval. Rows and columns of information stored in the memory are either called up for display or for refreshing by a pair of eight bit binary counters. The counters include a first row address counter 15 and a second column address counter 16. The address from each counter is forwarded to the random access memory through a single multiplexer 17 via address lines 18–20.

The video master sequencer 21 is used to control and time the sequence of operations carried out by the refreshing and display system. The sequencer is used to generate both the row address strobe pulses and the column address strobe pulses that are applied to the binary counters and the memory. The strobe pulses are timed through the sequencer so that the data stored in the memory is accessed so that it can be both displayed once and refreshed a number of times during each video field without the need of additional counters or higher levels of multiplexing. The counters are also reset by means of reset signals provided by the sequencer.

FIG. 2 illustrates certain key timing characteristics of a standard video field. The field is depicted graphically by line 30 that is plotted against time. As shown, the field contains 244 lines of video data that are scanned in sequence plus a vertical retrace interval. Each field, including the vertical retrace interval occurs about sixty times a second and has a time duration of 16.68 milliseconds. In contrast, it should be noted that the maximum storage time of most dynamic memory cells is slightly less than two milliseconds. This means that each cell can hold a usable charge for about two milliseconds before it must be refreshed. As can be seen, scanning throughout the dynamic memory once per field would fail to refresh the dynamic cells in sufficient time to enable the memory to retain the desired image information.

Turning now to FIG. 3, there is also shown graphically at 32 a single line of video data. The line includes 256 pixels or display cells that are selectively excited in response to the data forwarded from the memory to generate a visually discernible display pattern. At the end of each line there is provided a horizontal retrace interval which permits the horizontal trace to be brought back to the next start of scan position. During this horizontal retrace interval, a synch pulse and pedestal level are given by the video section. As illustrated, each video line has a duration of precisely 63.56 microseconds.

As should now be evident, it is convenient to store video information in the drive memory in a line per row and pixel per column basis. The "page" mode of operation is therefore used in the present memory wherein each row of memory contains one complete line of image data. At the beginning of a display line period, a long row address strobe pulse 40 (FIG. 3) is generated by the sequencer. At this time the selected row address is is fid over the address line 20 to the memory causing data from the row of cells to be transferred into associated sense amplifiers. The cells at the same time are refreshed. Immediately following $\overline{RAS}$low, Row/$\overline{COL}$ shown at 42 in FIG. 3, goes low, enabling the column address to the memory. Strobing $\overline{CAS}$shown at 44 in FIG. 3, while $\overline{RAS}$and Row/$\overline{COL}$are low, transfers the information in the addressed sense amplifier to the memory output buffer and then onto the display. Subsequent cycling of $\overline{CAS}$, each time addressing a different sense amplifier, transfers a complete row of data to the display.

In addition to generating a long row address strobe pulse, the sequencer is arranged to increment the row counter eight times during the horizontal retrace interval. These shorter duration pulses are depicted at 43 in FIG. 3. As noted above, the dynamic memory is arranged to automatically refresh one complete row of data each time a new row is addressed. Accordingly, during the time duration of each line, nine rows of memory are refreshed.

The table shown in FIG. 4 visually illustrates the refreshing procedure as the row address counter is incremented. As shown, the counter is incremented nine times during the period the first line is displayed on the screen. The next row to be displayed will thus be the tenth row of memory. The tenth row of memory, when accessed, will become the second line of display. Again, during the second horizontal retrace interval, eight more rows are refreshed. This procedure then continues until such time as all 244 lines of display are accessed. The entire memory is eventually scanned in nine full times during each field and the two millisecond refreshing requirement is thus fully met. When the present scheme is employed both during image storage and playback, no unnatural scrambling of the data is necessary. The only additional equipment cost that is encountered is for sequencer circuitry needed to generate the eight additional $\overline{RAS}$pulses at the end of each display time. This cost, however, is relatively small when compared to other known refreshing schemes that generally require two row address counters and an added level of multiplexing.

While this invention has been described with reference to the structure disclosed herein, it is not confined to the details set forth and this application is intended to cover any modifications or changes as may come within the scope of the following claims.

We claim:

1. In a video system wherein a field of image data that is to be displayed is stored in a refreshable memory, the method of refreshing the memory during the field that includes the steps of supplying a row address signal from a row address counter to the memory to select a row of memory for display at the beginning of a field, latching the selected row of memory whereby the row is refreshed, supplying a train of cloumn address signals from a column address counter to the memory to sequentially address each memory cell in the selected row whereby the data stored in the selected row is transferred to a video display means to provide a line video data, incrementing the row address counter a number of times during the video horizontal retrace period and supplying said address signals to the memory to sequentially refresh a given number of rows, incrementing the row address counter once again to address the next row to be displayed, and repeating the above noted steps until such time as the entire field of data stored in the memory is displayed.

2. The method of claim 1 wherein each row in the memory is refreshed within the maximum storage time of the memory cells.

3. The method of claim 1 that further includes the step of loading new data into the memory during the video vertical retrace period.

4. The method of claim 3 wherein the data loaded into the memory is stored in the same order as the data is transferred to the video display means whereby the stored data does not have to be descrambled.

5. The method of claim 1 wherein each video field has a duration of between 16 and 17 milliseconds and each row is refreshed at least nine times during each field.

* * * * *